United States Patent
Bjørneklett et al.

(10) Patent No.: US 7,494,553 B2
(45) Date of Patent: Feb. 24, 2009

(54) METHOD OF DETERMINING A HEAT TREATMENT AND MEMBER SO TREATED

(75) Inventors: Børge Bjørneklett, Gjøvik (NO); Ole Runar Myhr, Raufoss (NO); Tor Arne Stjern, Raufoss (NO)

(73) Assignee: Norsk Hydro ASA, Oslo (NO)

( * ) Notice: Subject to any disclaimer, the term of this patent is extended or adjusted under 35 U.S.C. 154(b) by 650 days.

(21) Appl. No.: 10/502,395

(22) PCT Filed: Feb. 7, 2003

(86) PCT No.: PCT/NO03/00048

§ 371 (c)(1),
(2), (4) Date: Jan. 25, 2005

(87) PCT Pub. No.: WO03/066383

PCT Pub. Date: Aug. 14, 2003

(65) Prior Publication Data

US 2005/0145305 A1    Jul. 7, 2005

(30) Foreign Application Priority Data

Feb. 8, 2002    (GB)  ................................. 0203059.1

(51) Int. Cl.
*C21D 11/00*    (2006.01)

(52) U.S. Cl. ........................................ 148/508; 700/97

(58) Field of Classification Search ................. 148/508; 72/342.94; 700/97
See application file for complete search history.

(56) References Cited

U.S. PATENT DOCUMENTS

| | | | |
|---|---|---|---|
| 3,983,962 A | 10/1976 | Torke | |
| 6,212,486 B1 | 4/2001 | Huang et al. | |
| 6,353,768 B1 * | 3/2002 | Karafillis et al. | ............. 700/97 |
| 2001/0032330 A1 | 10/2001 | Kusunoki | |
| 2004/0237622 A1 * | 12/2004 | Myhr et al. | ............. 72/342.94 |

FOREIGN PATENT DOCUMENTS

| | | | |
|---|---|---|---|
| EP | 0709274 | | 5/1996 |
| EP | 0 978 444 | | 9/2000 |
| JP | 10-128817 | | 5/1998 |
| JP | 2005267028 A | * | 9/2005 |
| WO | 9114110 | | 9/1991 |
| WO | 9703865 | | 2/1997 |

* cited by examiner

*Primary Examiner*—Scott Kastler
(74) *Attorney, Agent, or Firm*—Wenderoth, Lind & Ponack, L.L.P.

(57) ABSTRACT

A method is provided of determining a heat treatment to apply to a structural member so as to modify the deformation behavior of the structural member when subjected to an applied stress. The method includes first simulating the deformation behavior of the structural member when subjected to the applied stress. The effect of at least one heat treatment upon a part of the structural member is then simulated so as to determine a heat treatment to apply to the part of the structural member so as to produce a modified deformation behavior.

26 Claims, 10 Drawing Sheets

Temperature field [C°]

Yield stress [MPa]

METHOD OF DETERMINING A HEAT TREATMENT AND MEMBER SO TREATED

BACKGROUND OF THE INVENTION

1. Field of the Invention

The present invention relates to a method of determining a heat treatment to apply to a structural member, in particular to modify the deformation behavior of the member. The invention also relates to impact protection members when heat treated, so as to modify their deformation behavior.

In a vehicle crash situation, energy absorbing structures experience large variations in the local stresses and strains. While some regions of a member need to withstand high stresses, other areas are required to accommodate high strains in order to avoid problems of brittle fracture. The particular alloy, for example an aluminium alloy, that is chosen for the structure should be selected with both of these criteria in mind.

Increasing the gauge thickness in the product will normally satisfy the stress requirements but not without imposing a weight limitation. Quite often, high strength alloys are not suitable in crash absorbing products due to their limited ability to withstand high strains in exposed regions of the part. Traditionally, the solution to this problem is to select a more ductile alloy with less yield strength. This again brings back the problem of insufficient strength of the structure, which must be compensated for by increasing the gauge thickness.

When designing automotive parts, due attention must be given to the deformation behavior of the structure when it is submitted to high stresses or strains, for example during an accident. In particular, the front and rear bumper beams represent particularly exposed regions, and large efforts are put in controlling the deformation behavior of these regions. The more energy that can be absorbed in the outer part of the structure, the less damage is caused to the remaining internal part of the structure of the vehicle.

When constructing bumper beams, different methods are used in order to control the deformation behavior. For example, the use of tilted partitions and non-uniform plate thicknesses makes it possible to attain favorable deformation behaviors. Such physical geometrical features are, however, demanding and expensive to produce. Great effort is therefore directed at the construction of the simplest possible structure, which also exhibits the best possible deformation behavior.

2. Description of the Related Art

One example of a composite bumper of this kind is described in U.S. Pat. No. 4,252,355 which discloses a bumper section which is integrally molded with lugs. The bumper section and lugs each contain elongated reinforcement fibers. The energy of a crash is absorbed, at least in part, by the deformation of the lugs.

To enhance the effectiveness of bumper beams, crash boxes have been introduced between the inner vehicle structure and the external structure. When the forces on a crash box exceed certain critical values, the crash box deforms and thereby absorbs energy.

As is the case for bumper beams, the deformation behavior of a crash box during an impact is critical. If the crash box resists too high a stress, its impact absorbing capacity will occur after damage is done to the vehicle structure. If there are protrusions or holes in the side walls of the crash box, they will generate local zones of high stress concentration. The possibility of local crack propagation in these zones is increased due to the stress concentration. Cracking changes the deformation behavior of the crash box, and the ability to absorb energy by deformation is reduced when extensive cracking occurs.

One method of improving the ductility in a bearing member for a vehicle is disclosed in U.S. Pat. No. 5,492,207. The bearing member is subjected to a heat treatment to change the mechanical properties of the material from which the bearing member is constructed. As a result, the deformation behavior of the material is improved.

There is, therefore, a desire to provide an improved method of modifying the deformation behavior in such structural members, the goal being to achieve a fast and low cost method that is versatile in its applicability to different types of structural members.

BRIEF SUMMARY OF THE INVENTION

A first aspect of the present invention is a method of determining a heat treatment to apply to a structural member, so as to modify the deformation behavior of the structural member when subjected to an applied stress. The method includes:— simulating the deformation behavior of the structural member when subjected to the applied stress; and simulating the effect of at least one heat treatment upon at least a part of the structural member so as to determine a heat treatment to apply to at least the part of the structural member, to produce a modified deformation behavior.

The use of heat treatments to control the deformation behavior avoids many of the high costs and stress concentration problems associated with prior methods. Also, a great benefit is provided by simulating the deformations and heat treatments applied to the structural member. In each case, the need for expensive physical test pieces is avoided, and the number of simulations that may be performed is therefore unlimited.

Simulating the deformation behavior allows detailed analysis of the behavior of the structural member when subjected to a stress such that particular regions, for example stress concentration regions and high strain or cracking regions, can be located. The properties of the structural member can then be set within the simulation to analyze the effect of such modifications upon the deformation behavior.

Likewise, the simulation of heat treatments provides information regarding how the properties of the structural member will be affected as a result of the heat treatment. This allows a suitable heat treatment to be selected in order to provide particular properties at particular locations within the structural member.

The simulation of the deformation behavior and/or the heat treatments can be performed using an analytical model of a particular structural member. However, typically, the simulation of the deformation and/or simulation of the heat treatment is performed using a numerical modelling method. Such methods are particularly suitable in the case of complex geometries, and the numerical modelling is therefore typically performed using a finite element method. Finite element methods provide a very versatile tool in simulating the deformation behavior or the heat treatment for the structural member.

The heat treatment may be simulated as a general heat treatment applied to all parts of the structural member simultaneously, although preferably the heat treatment simulation is performed with a localized heat source. The heat source may also be movable within the simulation.

Typically, the heat treatment is modelled by considering the flow of heat through the structural member; preferably, a heat treatment is determined such that the simulated temperature generated in the structural member is less than the melting temperature for the material. This is because, in general, the structural integrity of the member must be maintained.

The heat treatment simulation may also include a microstructural simulation, so that the change in the microstructure of the material of the structural member is simulated as a result of the heat treatment. Microstructural changes have a corresponding effect upon the material properties of the structural member, although the degree to which such changes affect the material properties is dependent on the material used.

The heat treatment in the simulation is preferably defined by one or more parameters, and typically a number of heat treatments are simulated by varying one such parameter. Typical parameters include: the travel speed of the source, the heat input, the heat intensity distribution, or the maximum temperature of the source.

Preferably, the determination of the heat treatment to apply to the structural member is performed automatically. This may be achieved by inverse modelling or other iterative procedures. Such automatic selection may involve a large number of simulations and, therefore, high performance computer systems are preferred for this task. The automatic selection may also involve the selection of a heat treatment from a number of simulated heat treatments, each of these being generated as a result of varying the heat treatment parameter.

In principle, the structural member may be any component in which a particular function is required in accordance with the geometry and material properties of the member. The structural member may therefore be a strength member in a structure, or an impact protection member for a vehicle. Typically, the structural member is metallic and formed from a suitable alloy chosen for the specific application. Typical alloys include those containing aluminium such as age hardening aluminium alloys, or ferrous alloys such as steels.

The heat treatment or deformation simulations may be applied to all or part of the structural member in question. However, typically the method further includes selecting one or more regions forming part of the structural member in accordance with the simulated deformation. The one or more regions are therefore preferably selected as a result of a deformation simulation where particular properties exhibited by the structural member during deformation have been identified.

Each region may therefore be selected in accordance with a deformation property such as ductility, stress, strain, elongation or a fracture property. The choice of property for selecting the region(s) is dependent upon not only the application, but also the material used for the structural member. Generally, such regions are identified where a particular threshold in the selected property is passed. Such a threshold may be a material property such as the yield stress, or it may be a target threshold assigned by a user. In the case of an assigned threshold, the method, preferably, further includes repeatedly:

simulating the deformation of the structural member having the assigned deformation property threshold in each region;

comparing the simulated deformation with a desired behavior; and assigning a new target threshold and/or new region(s);

until the desired deformation behavior is simulated.

A region may therefore be assigned a particular threshold in a property, and the effect of the deformation using that particular property can then be determined and compared with a desired deformation behavior. A user of the simulation can therefore repeatedly modify the deformation behavior at will by selecting appropriate thresholds and appropriate regions.

The heat treatment is then preferably determined so as to produce a deformation behavior meeting the target threshold in each region.

Preferably, the selection of the one or more regions in which to apply a corresponding heat treatment is therefore also performed automatically, for example as part of the simulation. The automatic selection of the regions can be based upon those regions in which the strain in the material has exceeded a user defined threshold.

Although a desired deformation behavior may be simulated and subsequently a heat treatment determined so as to cause this deformation behavior, preferably the method further includes simulating the deformation behavior of the structural member in the heat treated condition. This enables the user to ensure that the desired deformation behavior will be produced. In some cases, this will be the case, although in others there is the possibility of a change in the overall deformation behavior of the structural member, for example by stress transfer. Further regions may then be identified in which a suitable heat treatment should be performed.

Having performed the simulations described, the method preferably further includes applying the determined heat treatment(s) to a physical structural member workpiece as represented by the simulation. It is desirable to use a similar heat source to that simulated and, therefore, the determined heat treatment(s) are preferably applied using a localized controllable heat source. This may take the form of a laser such as a diode laser or induction coil.

The method may also be extended to in-line analysis modification wherein structural member workpieces are analysed on a production line so as to generate monitored data. This may involve in-line dimensional analysis and material testing such as hardness testing in order to determine the strength of the material for each workpiece. A simulation of the deformation behavior may therefore be performed using the monitored data and a suitable heat treatment determined so as to provide a tailored heat treatment for the particular workpiece.

However, in many cases as the material properties and dimensions will not greatly vary, it is possible to produce simulations and corresponding heat treatments for a range of potential properties and dimensions of structural members such that the monitored data may be compared with that used in the simulations and a corresponding heat treatment simply selected, for example using a look-up table.

There are a number of applications in which the method according to the invention may be applied. However, the method is particularly advantageous for use in the automobile industry in the modification of the deformation behavior of a vehicle impact member as mentioned earlier. Such members include bumper beams and crash boxes, along with side impact bars and other components designed to protect passengers from an impact.

According to the present invention it is therefore possible to make use of higher strength alloys by modifying the ductility in specific areas of the product which are subjected to high strains. Moreover, as a supplement or replacement of physical geometrical features, the user can actively introduce local changes in the strength and ductility distribution in the workpiece. Special heat treatment patterns can also be used to increase the energy absorption of a structural member when subjected to large dynamic loads.

Such design features are not only invisible, but they are also highly cost-effective in implementation compared to the alternative processes of making complex protrusions, embossments, stampings and so on. The latter may represent impossible, or at best very unpractical fabrication steps for certain structures.

The first aspect of the invention provides a method of determining suitable heat treatments to modify the deformation behavior. In addition to this, a second aspect of the present invention includes an impact protection member. The impact protection member comprises at least one localized heat treated region, wherein each region is generated by the application of a heat treatment to a localized region of the impact protection member. Each heat treated region is arranged to modify the deformation behavior of the impact protection member when the member is subjected to an applied stress.

While the first aspect of the invention provides a method of determining suitable heat treatments to apply to structural members, the second aspect contemplates the use of heat treated regions in impact protection members. Specifically, the choice of these regions and their form may be chosen by any method, although preferably using the method of the first aspect of the invention. For example, their determination may be achieved by a knowledge based system or the use of empirical experimentation.

Each of the regions is localized with respect to the dimensions of the member. This localization provides the ability to control the deformation behavior more precisely, particularly regarding the maximum forces that are applied as a function of time in a vehicle impact situation. Preferably, each region is generated by the application of a heat treatment to a surface of the member, where the surface in question is defined by first and second axes (typically orthogonal). The localization is such that each region extends along only part of the surface with respect to each of the first and second axes.

In general, when a heat treatment is applied in this manner the heat treated region is localized such that, during application, thermal gradients are formed in the member along each of the first and second axes defining the surface, and the thermal gradients persist throughout the duration of the heat treatment. In many cases the regions are localized in that their dimensions are small with respect to the corresponding dimensions of the surface. They may therefore take the form of spots or small areas.

Although the positioning of the regions upon the impact protection member can in principle be anywhere and depends upon the deformation behavior required, each region is generally positioned upon the surface of the member such that it is substantially enclosed within the boundary of the surface. Typically, therefore, the region is located within the boundary of the particular surface in question, although it could be located adjacent an edge of the surface.

In most cases, more than one region is provided. A plurality of regions may be present on any surface and indeed upon multiple surfaces of the member, these regions typically being discrete. An increased number of regions allows for more complex modification of the deformation behavior. For a particular region, the effect of the heat treatment is preferably substantially similar through the thickness of the material, for example in a direction normal to the surface. This is often the case for impact protection members such as crash boxes formed with hollow sections of material.

The heat treatment in each case is selected according to the material and the configuration of the member so as to modify the deformation behavior in the manner desired. This modification typically includes an increase in the absorbed energy during an impact or a reduction in the applied stress at which the impact protection member initially deforms plastically.

BRIEF DESCRIPTION OF THE DRAWINGS

Some examples of methods and impact protection members according to the present invention will now be described with reference to the accompanying drawings, in which.

DETAILED DESCRIPTION OF THE INVENTION

Figure 1:
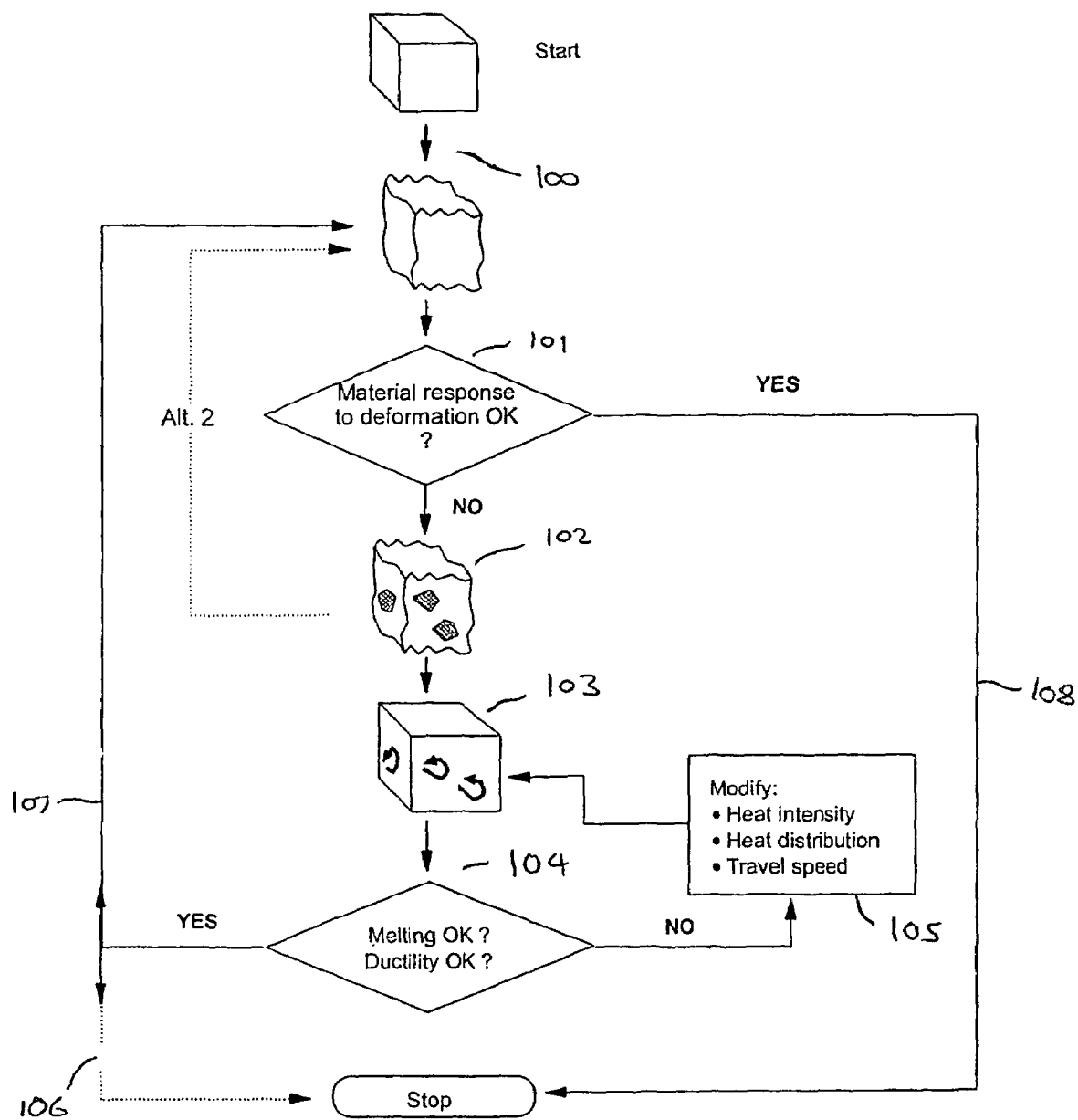
FIG. 1 shows a flow chart of the method according to a first example.

The flowchart in FIG. 1 shows the steps in determining the location and extent of a heat treatment to apply to a structural member. The flow chart is here further explained by reference to an example describing a bumper beam testing procedure. However, it will be obvious to a person skilled in the art that the flow chart and simulation method is generally applicable to procedures where it is desired to modify the deformation behavior in a structural member exposed to stress.

Figure 2:
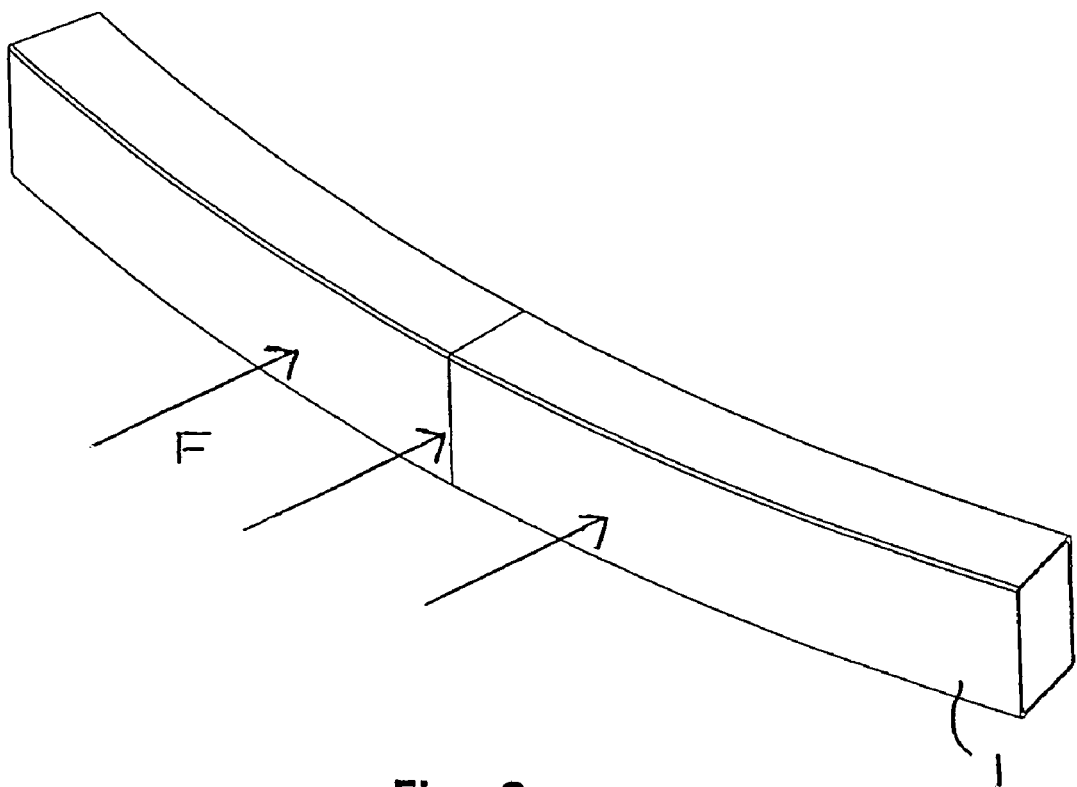
FIG. 2 shows a bumper beam model of known type.
Figure 3:
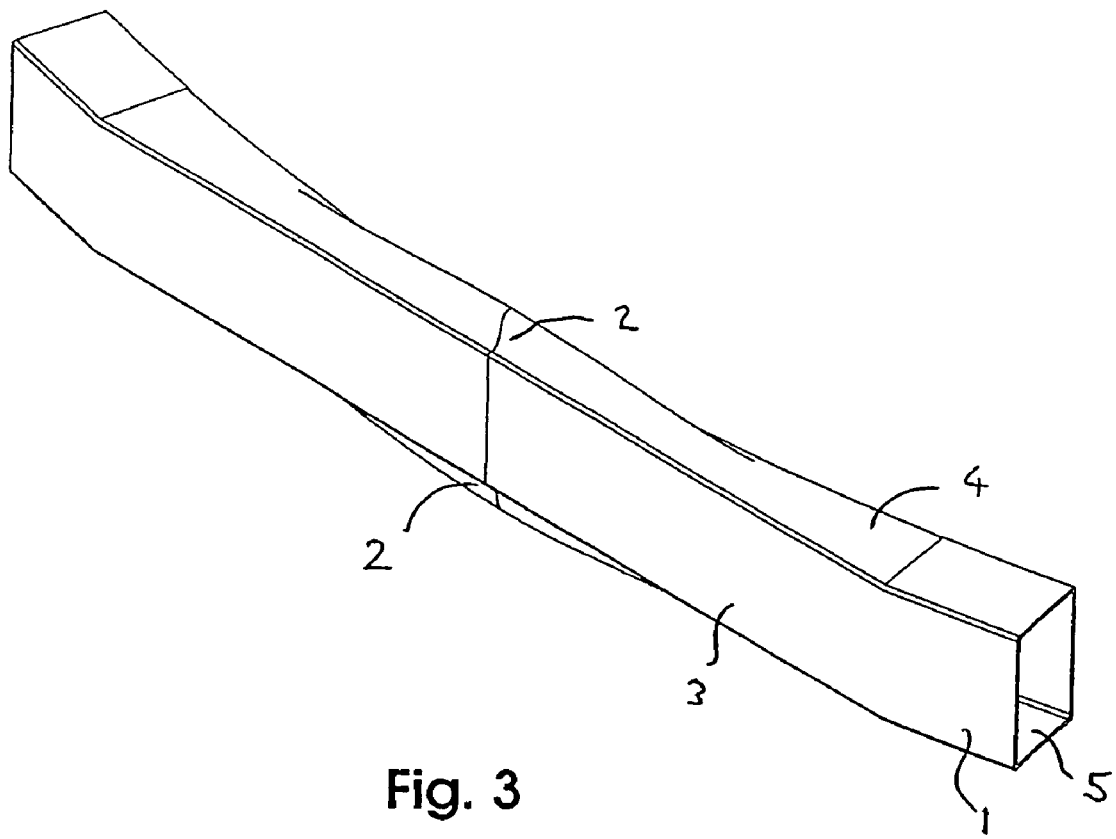
FIG. 3 shows a deformation in a bumper beam during a crash.

FIG. 2 shows a bumper beam model 1 of known type constructed from an aluminium alloy. In a normal crash situation, a force F will be applied on the bumper beam 1 as indicated by the arrows. Due to the applied force, the bumper beam deforms as indicated in FIG. 3. The impact forces leave dents 2 on the bumper beam as can be seen in FIG. 3, in which cracks are likely to occur. If cracks form in a structure, the ability to absorb energy is largely reduced. The main functionality of a bumper beam is to absorb energy and it is therefore important to avoid the forming and propagation of cracks. There are some important considerations when modifying the properties of a bumper beam 1. If the bumper beam 1 is too easy to deform, it will not absorb enough impact energy to avoid structural damage. On the other hand, if the bumper beam 1 is too hard to deform, the stress load required to start the deformation will be too high. The bumper beam 1 will then transfer the stresses through the crash box into the vehicle body, thereby causing damage along with injury to the passengers.

In order to solve the cracking problem, a simulation of the deformation behavior is performed upon a model of the bumper beam 1, with given values for yield strength, wall thickness and so on, and the applied force F. This is shown in step 100 of FIG. 1. The modelling is performed using a finite elements method implemented by software running upon a computer workstation.

At step 101 of FIG. 1, the results of the simulated deformation are analyzed. This may involve determining whether the deformation behavior meets standards required by a motoring manufacturer or a regulatory authority.

In the present example, the required standards are not met. Therefore, at step 102 of FIG. 1, the strain of the material during the deformation is used to define one or more regions within the structural member where the strain due to the applied force F is the greatest. These regions are the most at risk for cracking during a crash situation. The region(s) where dents or cracks are likely to occur are therefore defined, and the finite element method is used to bound these regions.

When the geometrical positions of the regions where crack propagation is likely to occur have been predicted and mapped, the next step is to carry out numerical modelling to determine a suitable heat treatment. A heat treatment is selected and modelled individually for each selected region at step 103. The simulated heat treatment in this case is applied using a localized heat source (analogous to laser heating). This heat source is also allowed to move so as to traverse each region. Typical parameters defining the heat treatment include the travel speed, direction and the intensity distribution.

Again, a finite element model is used to monitor the heat flow within the material of the bumper beam 1. The evolution of the microstructure of the bumper beam in the heated region is also simulated as this directly influences the material properties.

The heat treatment parameters may be selected automatically based upon previously provided data, or the user of the simulation model may enter the values directly.

When using high intensity heat sources it is important to avoid any melting of the heated regions, particularly for alloys having low melting points such as aluminium. One of the important issues is therefore to calculate heat intensities and trajectories that do not cause any melting of the surface. It is also important to control the extent of the heat affected zones in order to avoid too large changes in the overall mechanical properties of the structure. Distortions of the product may also occur as a consequence of thermally induced deformations although these can be predicted within the model.

The maximum temperature and the extent of micro structural changes in the heated zones are thus found. As a result the new material properties of each region are determined. In this case, the important property to control for a given strain is the ductility of the material. Typically, bumper beams are designed to have high strength properties in the region 3 (see FIG. 3) suffering the direct impact. However, the regions 4 and 5 usually do not require high strength, and it is more important to prevent crack propagation (and therefore to absorb energy) in these regions 4 and 5.

Figure 4A:
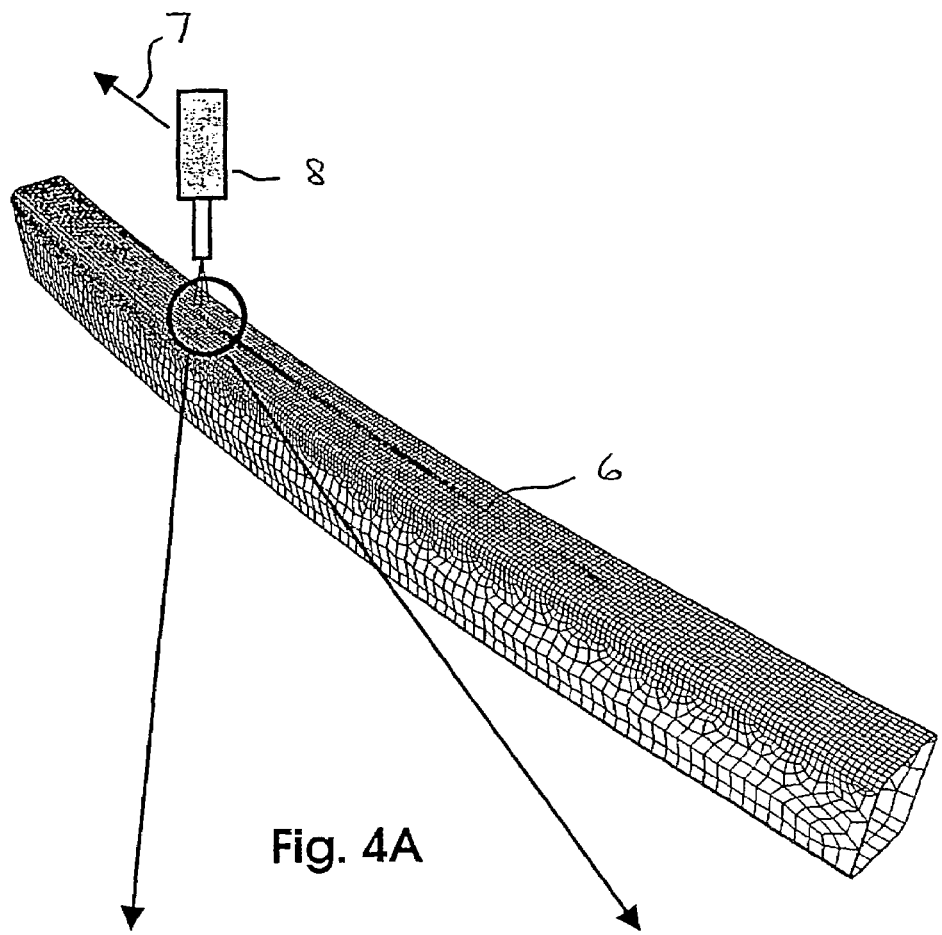
FIG. 4a shows the heat treatment of a bumper beam.

An example of a suitable heat treatment upon an identified region 6 is shown in FIG. 4a. The region 6 is identified as one in which extensive deformation is normally experienced. In order to avoid cracking in this region a heat treatment is determined to soften the material in the region 6, the simulated heat treatment being performed using a localized and moveable heat source 8 such as a laser beam. The direction of travel of the heat source is illustrated by arrow 7 in FIG. 4a.

The region 6 is situated on the top wall 4 of the bumper beam, and a corresponding region is situated on the lower wall 5 (see FIG. 3). In FIG. 4a, the heat source 8 has passed along the region 6 leaving a soft zone.

In this example, a Gaussian distribution function is used to simulate the heat source. The heat source has a net heat input of 1800 W and a travel speed of 50 mm/s. ninety-five percent of the heating effect is produced within a distance of 10 mm from the center of the source.

Figure 4B:
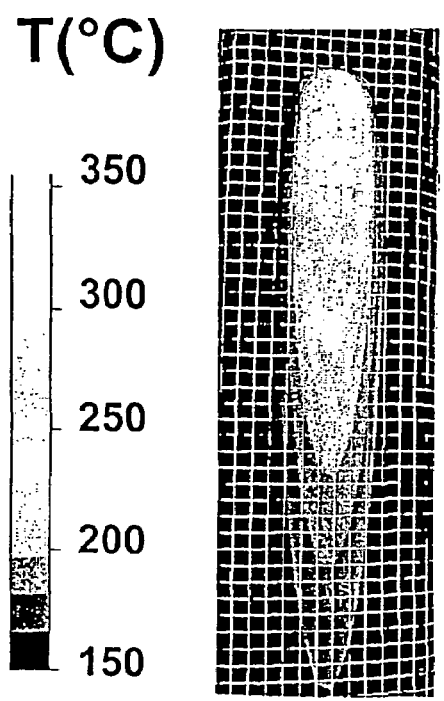
FIG. 4b shows the temperature gradient in the work piece during a heat treatment.

A heated zone in the bumper beam wall follows the heat source 8 during the simulated heat treatment. The zone has a temperature gradient as indicated in FIG. 4b. The maximum temperature attained is about 350° C. Around the heat source the temperatures are high, but descend rapidly as the beam moves along its path. The result in the bumper beam wall 4 is a region with a noticeably lowered yield strength and increased ductility, forming a soft line along the region 6 on the bumper beam 1.

Figure 4C:
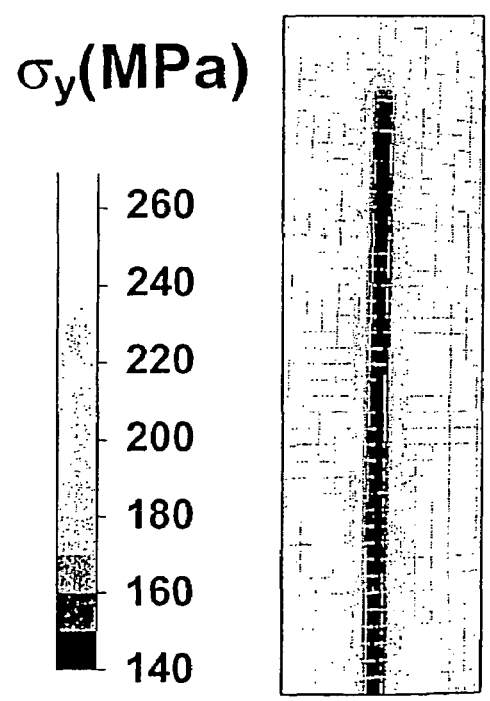
FIG. 4c shows the yield stress gradient in the work piece after a heat treatment.

FIG. 4C shows the simulated difference in yield strength. The region 6 has a predicted yield strength of around 140 MPa while the surrounding structure has a yield strength of 260 MPa. This reduction in yield strength is accompanied by approximately a 100% increase in elongation to fracture for the alloy of the beam in this example, AA6082.

Returning to FIG. 1, the predicted properties of the material within the region 6 are then compared with the desired properties at step 104. The desired properties are either those chosen automatically or those chosen by the model user.

If the changes in ductility due to the heat treatment of the specified zones are insufficient, a new heat treatment is determined at step 105 for the bumper beam in the state prior to heat treatment. Typically this involves using modified input values for the heat source intensity and travel speed. Steps 103, 104 and 105 may be repeated a number of times and the loop is terminated when melting of the material is avoided and the change in ductility has reached a desired value.

If however, after the first or one or more subsequent heat treatments, the ductility is found to be acceptable then the simulation process ends at step 106 as a suitable deformation and heat treatment have been identified.

However, in order to check that the heat treatment determined has the desired effect, typically the simulation of the deformation behavior is then performed again at step 107, using the modified material properties for the bumper beam 1. Due to the increased ductility of the material within the region 6, the deformation behavior is improved.

Should the material response to the applied stress still show an unwanted behavior, further regions are mapped upon the heat treated bumper beam 1, before a new coupled thermal-microstructural simulation is carried out with modified input data (steps 102, 103 . . . ). Otherwise, at step 108 the simulations are stopped.

When a suitable heat treatment has been determined for each region, these can then be applied to a real life bumper beam. Of course an analogous heat source should be used according to the heat treatment parameters of the simulation so as to increase the accuracy of the method.

A modification can be made to the above method in that the steps 100 to 102 can be performed repeatedly using different material property values for the regions selected prior to determining the heat treatment. For example, a user of the model may wish to identify regions within each simulated deformation and assess the effect of changing the material properties for those regions. This may in turn produce further regions of extensive strain.

In providing the user with the ability to determine the position of the regions and/or the properties within those regions, a preferred deformation behavior can be arrived at prior to the performance of any heat treatment simulations. This accelerates the overall speed of the method as processor time is not wasted in determining heat treatments for unsuitable deformations. The subsequent heat treatment for each region is then determined in order to produce the desired properties in the selected regions. This alternative is shown as "Alt.2" in FIG. 1.

A second example of the method is now described in the determination of a heat treatment to modify the deformation behavior of a crash box.

Figure 5:
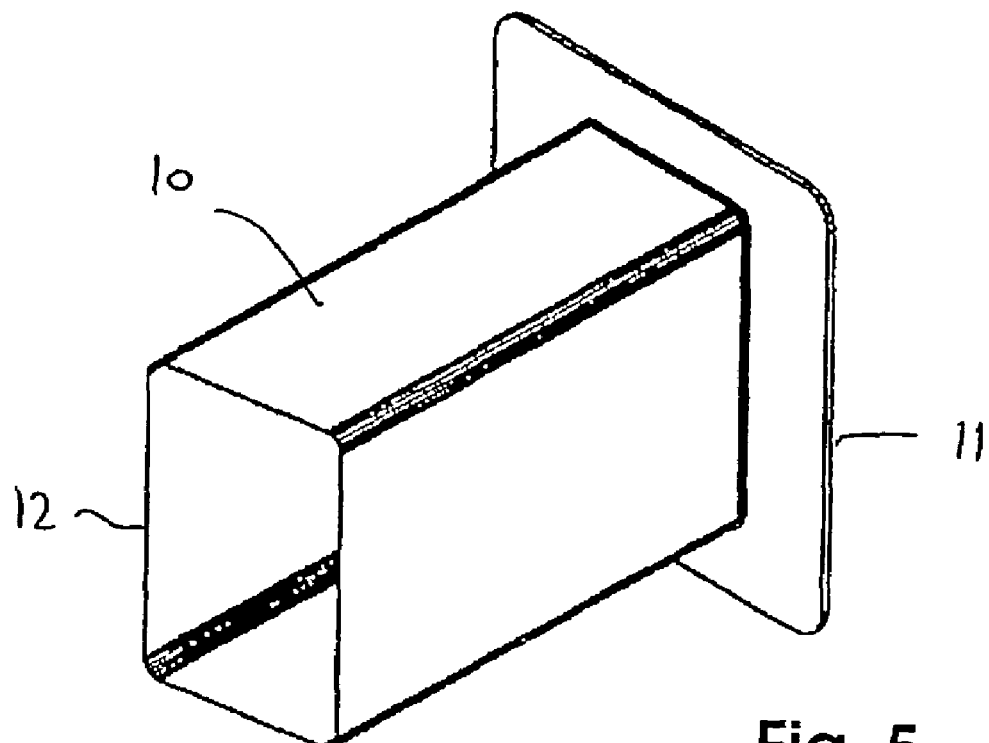
FIG. 5 shows a crash box model according to a second example.

A typical crash box 10 is shown in FIG. 5, constructed from an aluminium alloy. An end plate 11 is welded, bolted or otherwise attached to the bumper beam. The front 12 of the crash box 10 is attached to the main structure of the vehicle. When a force F is applied on the bumper beam, the crash box 10 will deform and absorb part of the energy of the impact.

Figure 6:
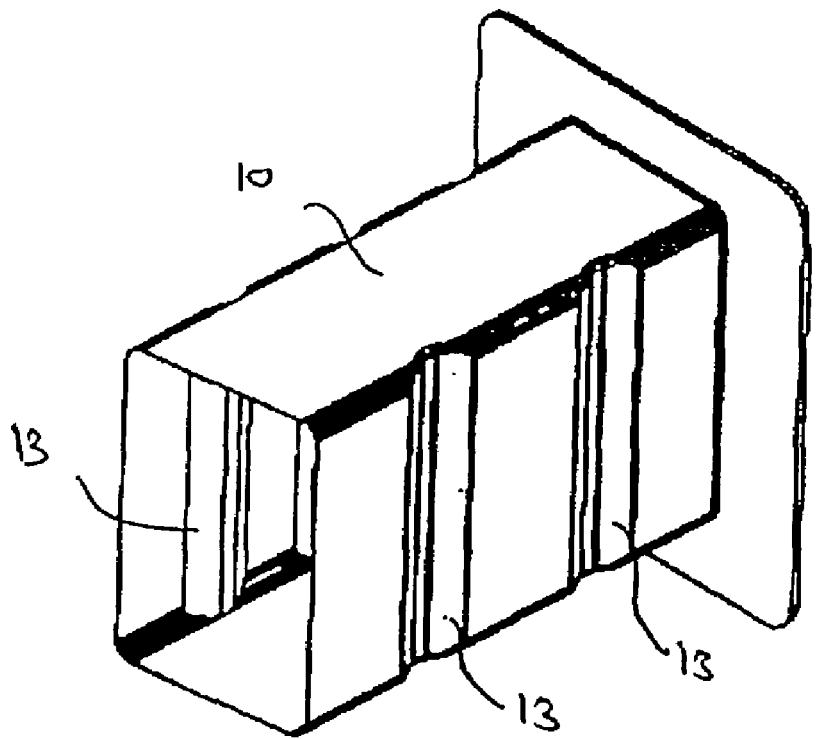
FIG. 6 shows a crash box with protrusions of known type.

In order to control the deformation behavior of the crash box 10, it is known to arrange protrusions or recesses 13 in the side walls, as shown in FIG. 6. This has the disadvantage of requiring more complicated processing of the component and, accordingly, greater expense in manufacture.

Figure 7A:
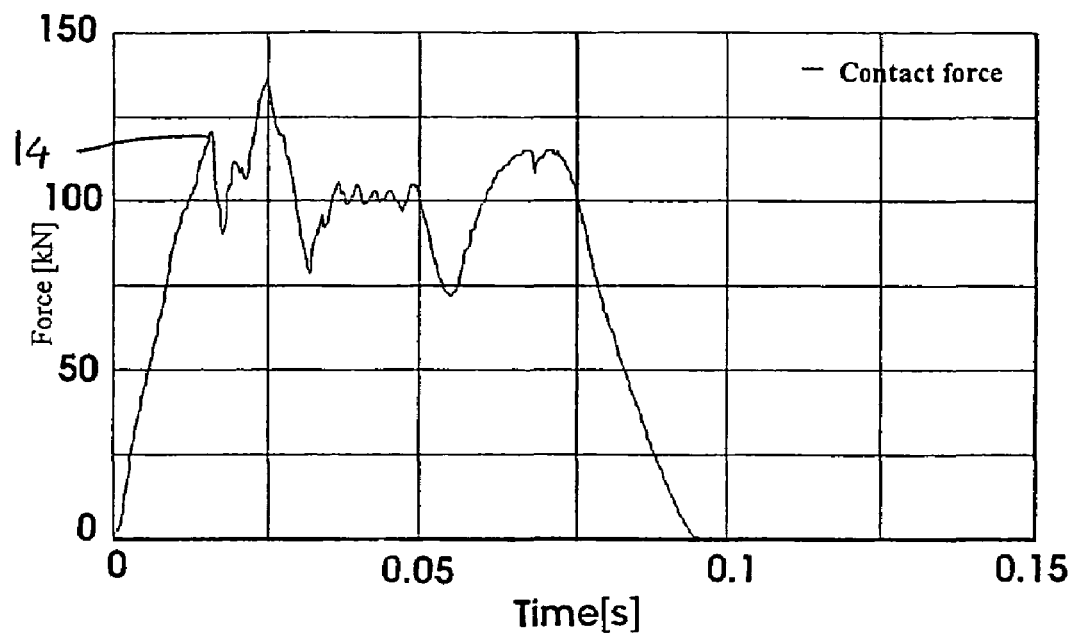
FIG. 7a shows a graph of applied force for deformation versus time in the crash box.

FIG. 7a shows a graph from a crash test upon a crash box, indicating the applied force (Y axis) necessary to attain deformation in a typical crash box of known type as a function of time (X axis). The first peak 14 in FIG. 7a shows the force necessary for any deformation to occur in the crash box. The next peak 15 indicates a hardening face in the deformation pattern. The second peak 15 shows that parts of the crash box start deforming only at a higher level of force. However, in crash box design it is known that improved safety performance results from delaying the maximum forces to later times in the impact. To improve this deformation behavior the zones causing the second peak 15 are firstly detected and then softened.

In this case, the regions were selected by a user, based upon experience. However, an analysis using the method described above could have been performed for the crash box 10, the position and extent of regions of high strain being calculated as a result of the deformation simulation.

Corresponding values were then assigned to the identified regions and an appropriate heat treatment determined for each, under the constraint that no melting of the material occurred as a result of each heat treatment. The resultant heat treatments were then applied to a real crash box 10' of the same specification as that simulated, in order to soften the regions and improve the deformation behavior.

Figure 7B:
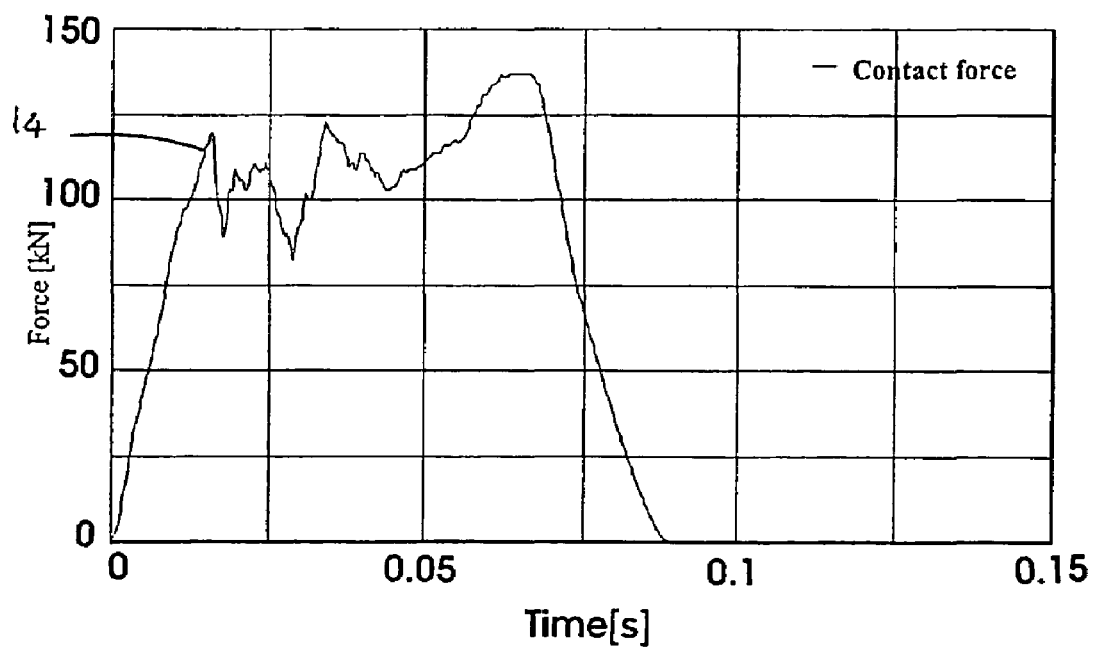
FIG. 7b shows a graph of the applied force for deformation versus time in the heat treated crash box.

FIG. 7b shows a graph equivalent to that of FIG. 7a for the crash box 10'. In FIG. 7b, the deformation of the crash box with soft zones starts at the same critical force level as the crash box without soft zones. After the deformation has started in the crash box 10', the forces applied to the crash box can be seen to be more constant through the deformation course. The second peak 15 which occurred in the previous example is eliminated due to the heat treatment. As indicated by the first peak in FIG. 7b, soft zones are introduced through heat treatment without losing the overall energy absorbing capacity of the crash box.

Figure 8A:
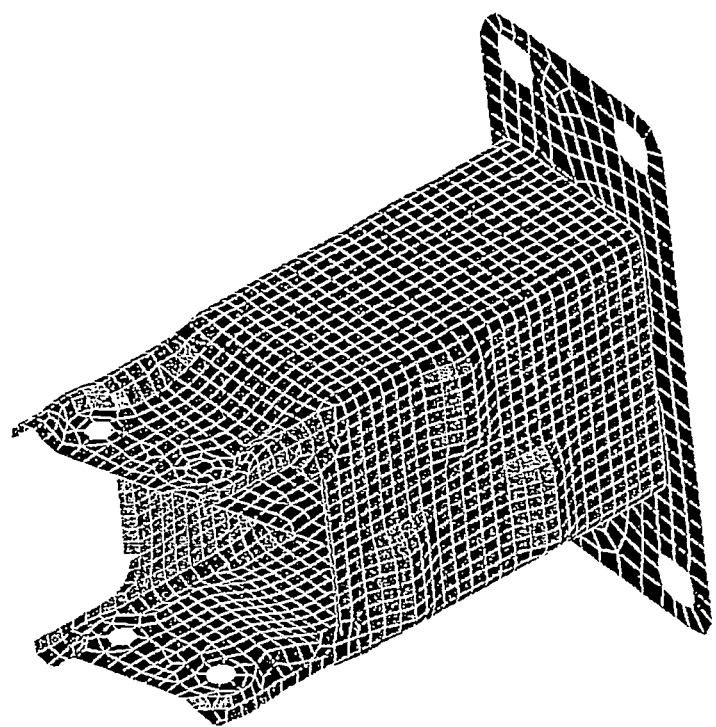
FIG. 8a shows the crash box used as an example to obtain the deformation curves of FIGS. 7a and 7b.
Figure 8B:
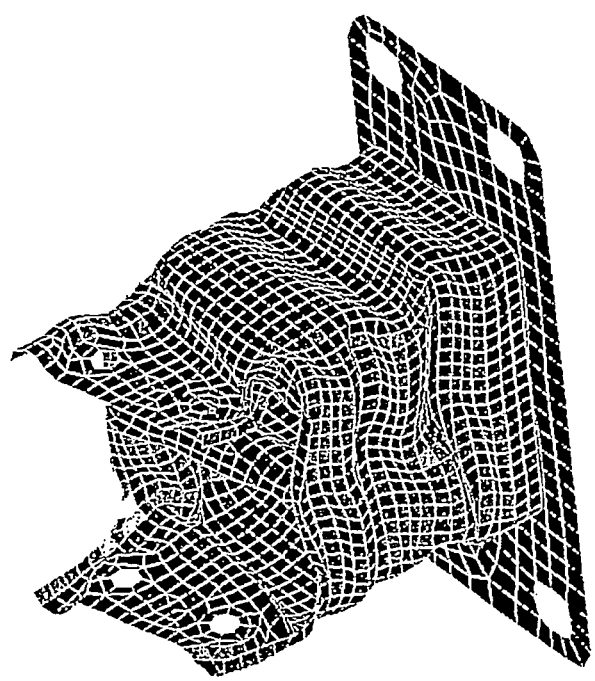
FIG. 8b shows the crash box of FIG. 8a after an impact has caused deformation.

FIG. 8a shows the simulated undeformed crash box 10 having the response shown in FIG. 7a. FIG. 8b shows the simulated deformation behavior of the crash box 10' corresponding to FIG. 7b.

Figure 9A:
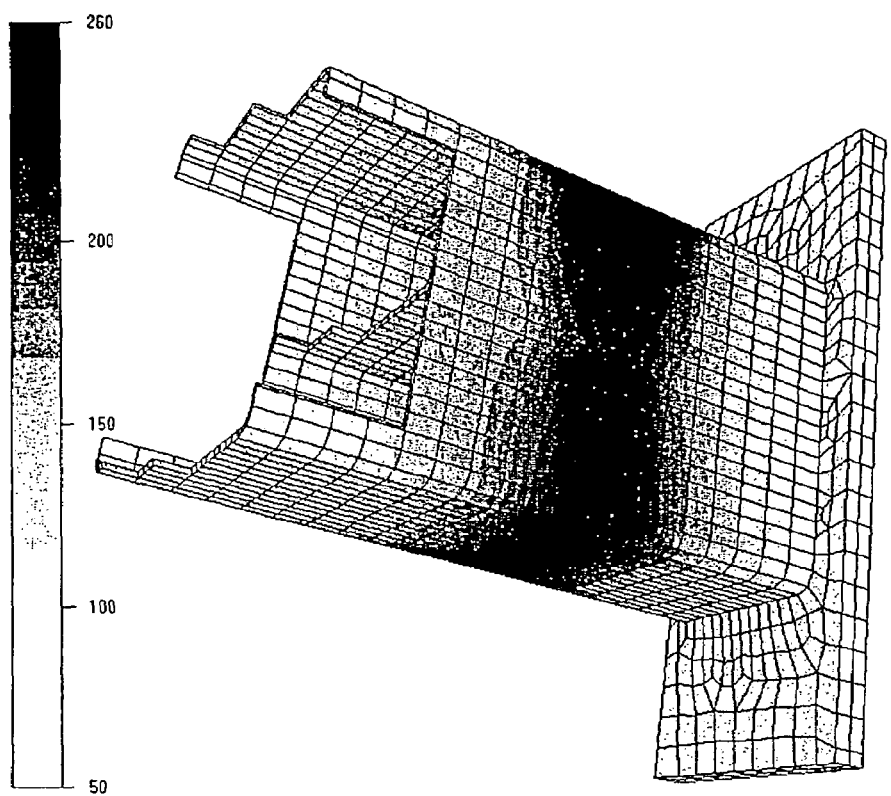
FIG. 9a shows the temperature gradient during heat treatment of the a crash box.
Figure 9B:
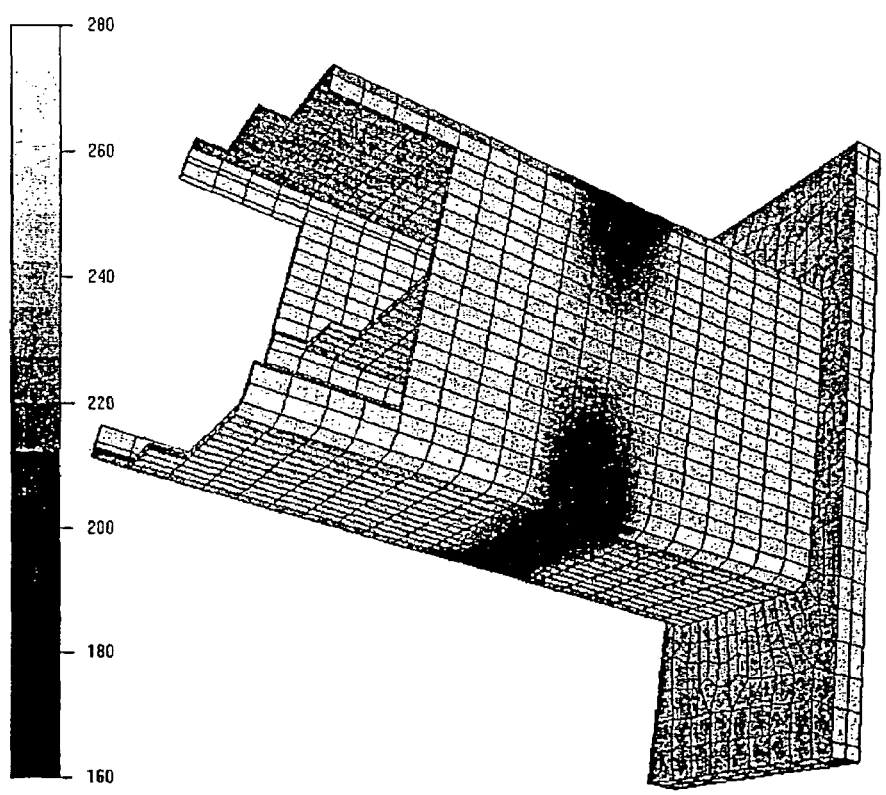
FIG. 9b shows the yield strength gradient after heat treatment of the crash box.

FIG. 9a shows the extent of the local heat treatment upon the crash box 10'. This results in soft zones of lower yield stress being generated within the crash box 10' as indicated in FIG. 9b. The material will also experience some strength recovery upon prolonged natural aging or upon an artificial aging heat treatment, although this is not shown in the figure.

Figure 10A:
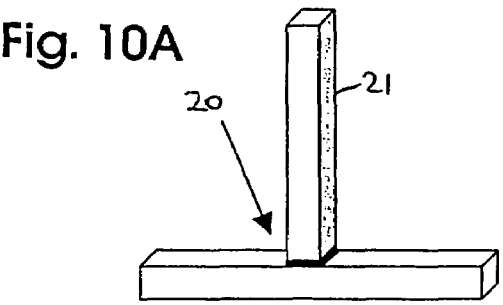
FIG. 10a shows a T-joint according to a third example.
Figure 10B:
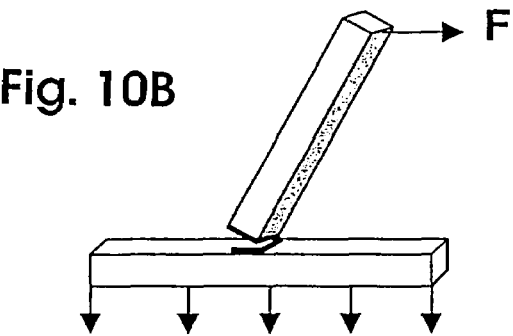
FIG. 10b shows the T-joint with forces applied to it.
Figure 10C:
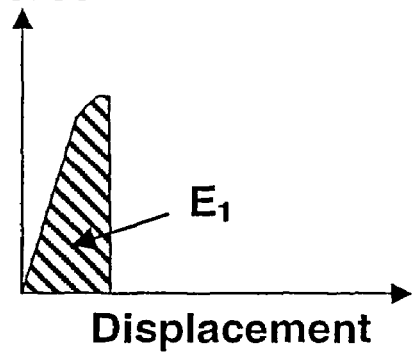
FIG. 10c shows a graph of energy absorbed by the T-joint.

A third example of the method is now described with reference to a welded T-joint. FIG. 10a shows a typical welded T-joint which is commonly seen in many structures. In the weld metal 20 in the joint, the material is generally more brittle, as is well known. Due to the location of the weld 20 partly in a corner where the highest stresses will occur, cracking in the joint often becomes a problem as illustrated in FIG. 10b. The energy absorbed by the T-joint before deformation is dependent on the force applied to the beam 21 and on the displacement of the beam 21. If the displacement is small, the energy $E_1$ absorbed is correspondingly small as seen on the graph of FIG. 10c. This is an important factor for example in vehicle structures which are constructed to tolerate as high forces of impact as possible during collision without damaging the passengers.

A way to solve the lack of ductility in the construction, is to perform the method described in connection with FIG. 1. Regions of high stress and strain in the T-joint are mapped through a simulation of the structure when it is subjected to external forces. Cracking may occur because of too low ductility in the joint and surrounding areas. A solution to the ductility problem is to introduce a soft zone in a region 22 in the beam 21 above the weld.

Figure 11A:
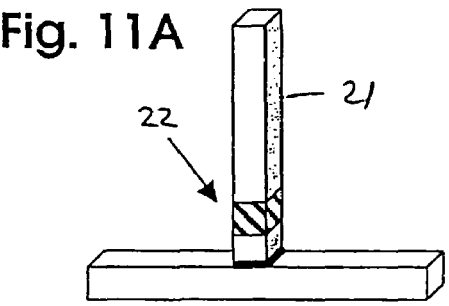
FIG. 11a shows the T-joint after heat treatment.

It should be noted that this region 22 does not correspond to that in which the cracking or fracture is most likely to occur as the weld metal does not respond as well to heat treatments as the base material. To achieve the soft zone in the region 22, a suitable heat treatment scheme is predicted through simulation. The beam 21 is then heat treated in accordance with the determined heat treatment so as to generate a local soft zone 22, as shown in FIG. 11a. This soft zone distributes plastic deformation over a larger area and the structure thereby absorbs more deformation energy.

Figure 11B:
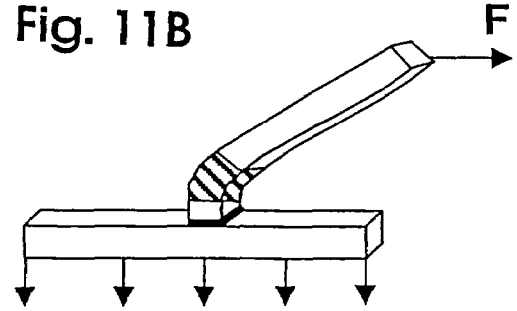
FIG. 11b shows the T-joint after heat treatment with forces applied to it.
Figure 11C:
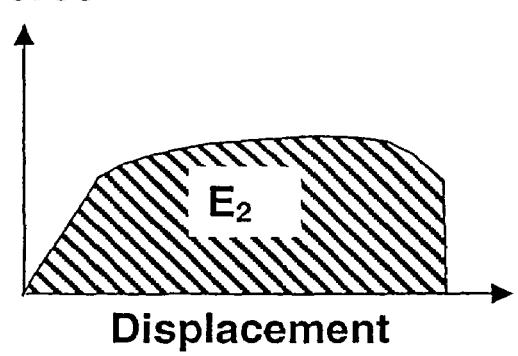
FIG. 11c shows a graph of energy absorbed by the heat treated T-joint.

This concept is schematically illustrated for the T-joint 20 containing a soft zone 22 which acts to divert high strains away from the brittle weld 20 and thus avoid early fracture of the structure. The beam 21 will bend in the soft zone 22, avoiding cracking of the weld 20 as shown in FIG. 11B. A graph of the energy ($E_2$) absorbed is schematically shown in FIG. 11c for comparison with a corresponding graph for the untreated structure in FIG. 10c. With the increased displacement of the beam 21, the energy absorbed during deformation is increased.

The above methods can also advantageously be used for in-line material modification in a production process. Fabrication of crash components or systems comprising for example a set of crash boxes and a bumper beam are subject to strict tolerances with respect to chemical composition of the alloys and geometrical dimensions. These factors are paramount in order to meet the carefully designed behavior of the system during a crash.

However, process tolerances inherent in fabricating parts from materials such as extruded aluminium will sometimes result in final parts that exhibit deviations from the designed energy absorbing capacity. Particularly problematic is the occurrence of alloys with higher yield stresses than anticipated or parts that have higher gauge thicknesses. Under such circumstances the part may not collapse properly, and plastic deformation may translate further into the vehicle structure.

A solution to this problem is to use the method described above as part of an inline modification method with continuous simulation and adjustment of the mechanical properties of the components during production.

At the start of the production, the properties of the alloy in the workpiece are determined by automatic hardness measurement or alternatively by some real-time chemical analysis. In addition the gauge thickness of the most critical areas are measured. This can be done optically, mechanically, with eddy currents or any other practical means. The resulting material response according to the parameters is simulated, thereby mapping any critical regions. If the response shows unwanted energy absorbing behavior, a corrective step is performed by subjecting one or several areas of the part to a short thermal cycle that appropriately renders the mechanical properties in selected regions from a maximum strength condition to a softened material.

As the variations in the strength and dimensions of such components is likely to be within certain boundaries, it is feasible to simulate suitable heat treatments for a range of possible strength and dimensional variations. An appropriate heat treatment can then be selected from these predetermined simulated heat treatments which avoids the need for repetitively performing similar simulations. This has a corresponding speed advantage.

The heating is preferably conducted by induction coil, plasma, gas flame, laser or other confined heat sources but without melting the material. It has previously been shown by simulation that such rapid temperature cycles may significantly change the nature of collapse and total energy absorption of a crash box.

Recent experimentation has shown us that the design of these thermally induced "triggers" (thermally treated localized regions, which are in general soft zones) using the method as described above is an excellent method of controlling force versus displacement in crash boxes. The concept is fabrication friendly and cheap.

Such localized regions can be placed quickly within a structural member and without the use of any backing material. The size and effect of the region is easily adjusted by the power input and for example, induction coil design. The localized thermal trigger regions can be placed in almost any position and in areas that are difficult or impossible to access by traditional tooling.

By utilizing the finite element techniques described above combined with an appropriate nano-structure model for the specific material, it is possible to determine the exact extent and effect of such thermal triggers upon the deformation properties of the structural member in question. This in turn, enables designers to perform crash simulations upon products containing such localized regions.

Some experiments are now described, involving the use of triggers as localized regions within impact protection members such as vehicle crash boxes, with a view to reducing the initial load peak experienced during an impact (as previously illustrated in FIGS. 7A and 7B).

Extrusions of an aluminium alloy, AA6063, for a front crash box 25 were cut into lengths and heat treated to the T6 temper condition. The flanges were machined off. The dimensions of this front crash box were about 220 mm by 92 mm by 58 mm, with a wall thickness of about 2 mm, these values being about the same as those for the crash boxes shown in FIGS. 8A, 8B, 9A, and 9B. A series of thermal triggers were then placed in various patterns across the crash box utilizing an induction coil connected to a standard EDF-Elva 45 kW rectifier. The control parameters used were a current of 60 A and a potential difference of 130V.

Figure 12:
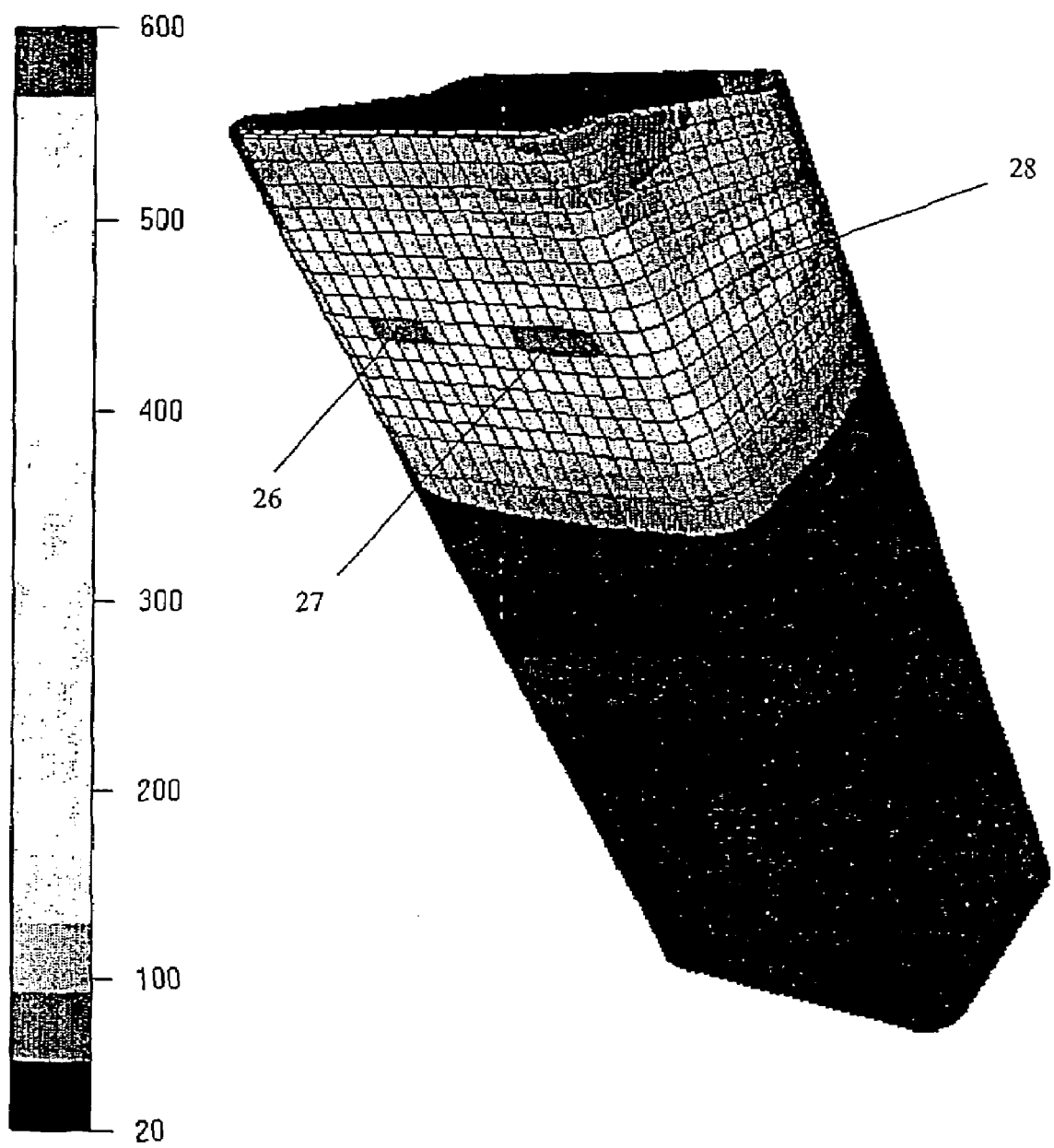
FIG. 12 shows a crash box with heat treated regions.

In order to achieve this, an experimental, manually operated induction coil with a footprint of 40 mm by 8 mm was placed adjacent to the material. One such arrangement of heat triggers for this front crash box 25 is shown in FIG. 12. FIG. 12 shows the peak temperature field (temperatures in degrees Celsius) for three triggers 26, 27, and 28 respectively, after 5 seconds of heating each localized region with the experimental coil. An additional three triggers are symmetrically positioned on the opposing hidden surfaces. The shading of the figures indicates the thermal gradients generated in the surface of the crash box. Similar gradients are experienced through the 2 mm thickness of the material due to the high thermal conductivity. The thermal cycle experienced at each point within the crash box determines the local material properties and, as a consequence, the deformation behavior.

In experiments, the crash box 25 as shown in FIG. 12, having six triggers (three shown in the figure) placed about 20 to 30 mm from the end 29 of the crash box, proved to be particularly effective in reducing the initial load peak. The end 29 of the crash box 25 shown in FIG. 12 is orientated facing towards the front of a vehicle when the crash box is installed.

Six consecutive runs, next to each other, constructed the triggers as localized regions. In a production environment, a single angular ring or one coil facing each side of the box could be used simultaneously.

Press tests were performed upon three of the crash boxes 25 of the type described above. Each press test was performed with an instrumented servo-hydraulic press so as to provide sampled values for force and displacement during axial deformation of the box.

Figure 13:
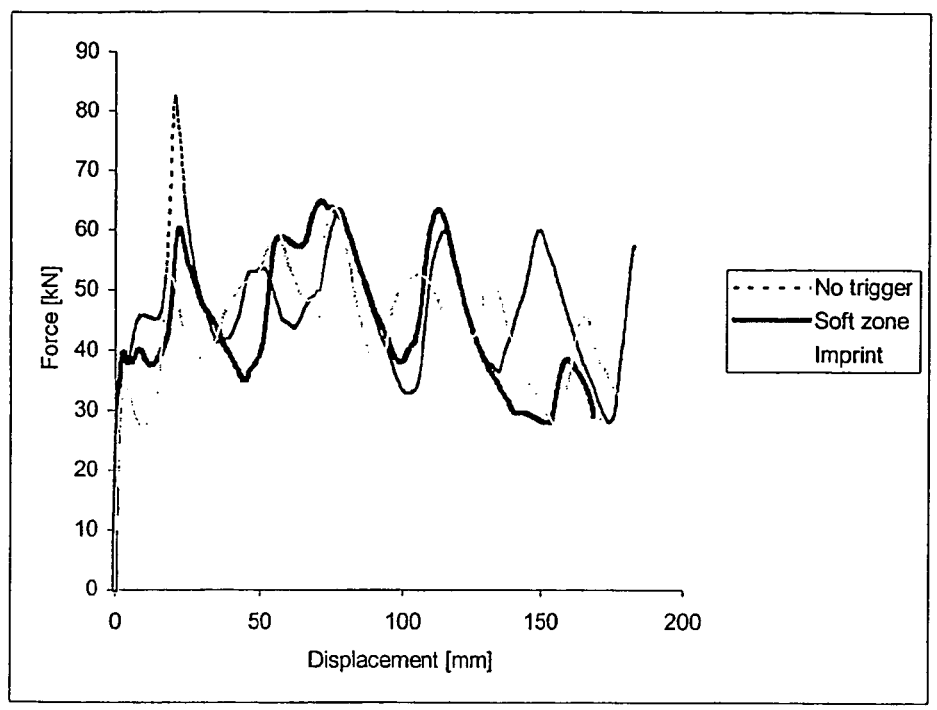
FIG. 13 is a graph comparing the deformation behavior of impact protection members.

The first crash box had no trigger, the second had a thermal trigger and the third had traditional "imprints", that is regions such as those shown at 13 in FIG. 6. The recorded corresponding force-displacement data is shown in FIG. 13. It can be seen that the initial yielding peak at a displacement of about 20 mm is reduced for the crash box with thermal triggers. This demonstrates that the 6 thermal triggers acting as soft zones give a desired reduction in the force experienced at the early stage of deformation. The purpose of the trigger in each case is to initiate a controlled folding or buckling of the box during compression and, therefore, absorb the energy of an impact. Without any trigger the initial force becomes unacceptably high, which again may either lead to damage of other parts of the vehicle to which the crash box is mounted, or harm to the passengers.

The traditional way of reducing such initial high force is by geometrical triggers, that is using "imprints". The chart indicates that the crash box 25 with thermal triggers functions as well as the box having geometrical triggers (imprints).

Figure 14:
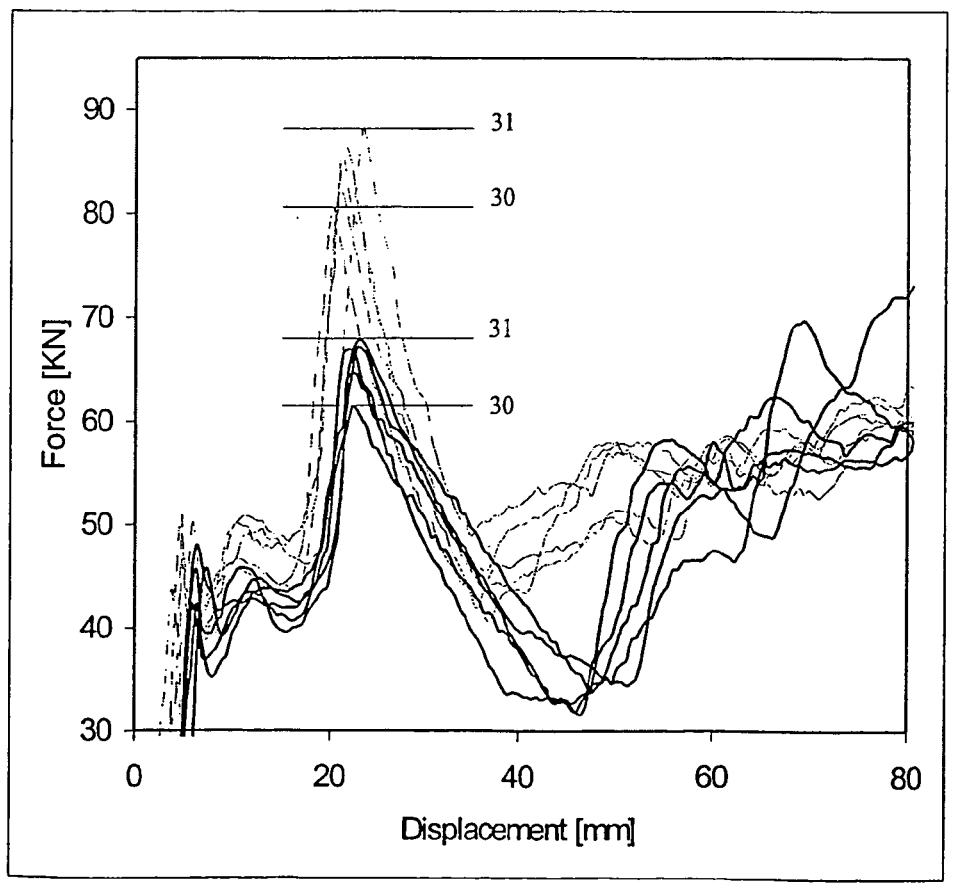
FIG. 14 shows the repeatability of the method.

In order to obtain an indication of the repeatability of the experiments, 5 crash boxes with thermal triggers and 5 without any triggers were subjected to the press test. A graph of force versus displacement, focusing on the critical initial phase of deformation (the first 80 mm), is shown in FIG. 14.

It should be noted that the initial peak is reduced by about 25% in the heat treated (trigger) samples. The deviations between the measurements in the crash box samples are about the same for boxes with and without triggers. In each case the minimum value is shown at 30, and the maximum at 31 in FIG. 14.

Practically, in a commercial production line, the cycle time can be conservatively estimated as about 7 seconds per box. Relatively simple machinery is required to achieve this. Assuming that the crash boxes were positioned for example on a conveyor, the actual coils could preferably operate along a single axis, automatically pushing the coils towards the surface of the box. Alternatively, an angular ring coil could be placed concentrically over the crash box. The optimized cycle time could actually be as low as 2-4 seconds.

As an addition to heating as a softening operation, it is also feasible to remove a calculated amount of material by rapid machining of one or several selected areas. In addition, exposure to strong chemical etching in a predetermined period can remove the desired material.

Preferably and advantageously, the heat treatment scheme is developed for a flexible high-intensity heat source. With the use of a controlled direct diode laser or possibly specially designed induction coils, it is possible to facilitate fine lines, spots or intricate patterns that possess material properties substantially different from the adjacent base material.

The method according to the present invention is not limited to heat treatments in which heat is applied as illustrated by the above examples. In some cases, based on the performed simulation, a suitable cooling treatment may be applied as part of the fabrication process, as an appropriate way of modifying the material properties of the structural members. A heat treatment using controlled cooling can be applied as part of a hot fabrication process.

One of the challenges resolved by the present method is to find a sufficient amount of heating to prevent the material from melting. A great advantage of the method according to the invention is that these values are found through simulation before any full scale testing.

Another important aspect of the method is that it is possible to define and control the extent of the heating, and thereby determine the exact extent of the heat affected zone. Due to the highly concentrated heating in localized regions, it is possible to limit the heat treatment much more exactly than known heat treatment methods.

The invention claimed is:

1. A method of determining and applying a heat treatment to a structural member so as to modify a deformation behavior of the structural member when subjected to an applied stress, said method comprising:
   monitoring the structural member so as to generate monitored data;
   simulating the deformation behavior of the structural member when subjected to the applied stress using the monitored data;
   simulating the effect of at least one heat treatment upon at least a region of the structural member;
   determining a suitable heat treatment to apply to at least the region of the structural member to produce a modified deformation behavior; and
   applying the suitable heat treatment to the structural member.

2. The method according to claim 1, wherein said simulating of the deformation behavior uses a numerical modelling method.

3. The method according to claim 1, wherein said simulating of the effect of at least one heat treatment uses a numerical modelling method.

4. The method according to claim 2, wherein the numerical modelling method comprises a finite elements method.

5. The method according to claim 1, wherein said simulating of the effect of at least one heat treatment uses a localized heat source.

6. The method according to claim 1, wherein said simulating of the effect of at least one heat treatment comprises uses a moveable heat source.

7. The method according to claim 1, wherein said determining of the suitable heat treatment comprises determining the suitable heat treatment such that a temperature of the structural member during said applying of the suitable heat treatment is less than a melting temperature of the structural member.

8. The method according to claim 1, wherein said simulating of the effect of at least one heat treatment comprises simulating the effect of a plurality of heat treatments by varying a heat treatment parameter to simulate the effect of the number heat treatments.

9. The method according to claim 8, wherein the heat treatment parameter is a travel speed of a heat source, a heat input of the heat source, a heat intensity distribution of the heat source, or a maximum temperature of the heat source.

10. The method according to claim 1, wherein said determining of the suitable heat treatment comprises determining the suitable heat treatment automatically.

11. The method according to claim 1, further comprising selecting one or more regions of the structural member in accordance with said simulating of the deformation behavior.

12. The method according to claim 11, wherein said selecting of the one or more regions comprises selecting the one or more regions in accordance with a deformation property.

13. The method according to claim 12, wherein the deformation property is ductility, stress, strain, elongation, or a fracture property.

14. The method according to claim 12 wherein said selecting of the one or more regions comprises selecting the one or more regions in accordance with a threshold of the deformation property.

15. The method according to claim 12, further comprising assigning a target threshold to the deformation property for each region.

16. The method according to claim 15, wherein said simulating of the deformation behavior of the structural member comprises repeatedly:
   simulating the deformation behavior of the structural member in accordance with the assigned target threshold in each region;
   comparing the simulated deformation behavior with a desired deformation behavior; and
   assigning a new target threshold and/or selecting one or more new regions, until the simulated deformation behavior is the desired deformation behavior.

17. The method according to claim 15, wherein the said determining of the suitable heat treatment comprises determining a heat treatment which produces a deformation behavior meeting the target threshold in each region.

18. The method according to claim 17, wherein said simulating of the deformation behavior of the structural member comprises repeatedly:
   simulating the deformation behavior of the structural member in accordance with the assigned target threshold in each region;
   comparing the simulated deformation with a desired deformation behavior; and
   assigning a new target threshold and/or selecting one or more new regions, until the simulated deformation behavior is the desired deformation behavior, the desired deformation behavior being the deformation behavior meeting the target threshold in each region.

19. The method according to claim 11, wherein said selecting the one or more regions comprises automatically selecting the one or more regions.

20. The method according to claim 11, wherein said simulating of the deformation behavior of the structural member comprises simulating the deformation behavior of the structural member in a heat treated condition.

21. The method according to claim 20, further comprising selecting one or more additional regions for subsequent heat treatment in accordance with said simulating of the deformation behavior of the structural member in the heat treated condition.

22. The method according to claim 1, wherein said applying of the suitable heat treatment comprises utilizing a localized, controllable heat source.

23. The method according to claim 22, wherein said applying of the suitable heat treatment comprises utilizing a laser or induction coils.

24. The method according to claim 1, wherein said determining the suitable heat treatment comprises selecting a heat treatment for the at least one region of the structural member from a group of predetermined heat treatments for the structural member.

25. The method according to claim 1, wherein said applying of the suitable heat treatment comprises applying the suitable heat treatment to a structural member including at least two substructural members welded together.

26. The method according to claim 1, wherein said applying of the suitable heat treatment comprises applying the suitable heat treatment to a vehicle impact member.

* * * * *